United States Patent [19]

Nagai

[11] 3,778,670

[45] Dec. 11, 1973

[54] HORIZONTAL DEFLECTION CIRCUIT

[75] Inventor: Tamiji Nagai, Kanagawa, Japan

[73] Assignee: Sony Corporation, Tokyo, Japan

[22] Filed: Feb. 1, 1972

[21] Appl. No.: 222,498

[30] Foreign Application Priority Data

| | | |
|---|---|---|
| Jan. 29, 1971 | Japan | 46/3404 |
| Nov. 6, 1971 | Japan | 46/103701 |

[52] U.S. Cl. .......... 315/27 TD, 315/27 R, 315/28, 315/29

[51] Int. Cl. .......... H01j 29/70

[58] Field of Search .......... 315/27 R, 27 TD, 315/28, 29

[56] References Cited

UNITED STATES PATENTS

| | | | |
|---|---|---|---|
| 3,144,581 | 8/1964 | Greenburg et al. | 315/27 TD |
| 3,452,244 | 6/1969 | Dietz | 315/27 R |
| 3,626,238 | 12/1971 | Forster | 315/27 TD X |
| 3,638,067 | 1/1972 | Dietz | 315/27 TD |

*Primary Examiner*—Benjamin R. Padgett
*Assistant Examiner*—P. A. Nelson
*Attorney*—Lewis H. Eslinger et al.

[57] ABSTRACT

A solid-state horizontal deflection circuit including a high voltage applying circuit for a television receiver or the like in which a gate-controlled switching device is used for applying a deflection current to a horizontal deflection coil to perform horizontal beam scanning and another semiconductor switching device is used for applying a pulse voltage to a flyback transformer to produce a high voltage supplied to a cathode ray tube, and further a couple of diodes connected in series are provided in connection with the above two switching devices. Both switching devices are turned on in response to a horizontal driving signal supplied to at least one of them and turned off by the recovery current of the series-connected diodes.

11 Claims, 21 Drawing Figures

HORIZONTAL DEFLECTION CIRCUIT

BACKGROUND OF THE INVENTION

1. Field of the Invention

This invention relates generally to horizontal deflection circuits for a television receiver or the like and more particularly to a solid-state horizontal deflection circuit including a high voltage producing circuit and using a gate-controlled switching device for applying a deflection current to a horizontal deflection coil.

2. Description of the Prior Art

In solid-state horizontal deflection circuits for use in television receivers or the like, a switching element employed in the horizontal output stage is required to withstand a high voltage and must be capable of carrying large current. It is the practice in the art to employ a specially selected, expensive transistor of large current carrying capacity and high inverse voltage. In order to avoid the use of such an expensive transistor, a proposal has been made to employ a cheaper thyristor, for example, a semiconductor device referred to as a gate-controlled switch (GCS). This GCS is sometimes called a GTO (a gate turnoff switch). The GCS consists of a first P-type semiconductor layer, a first N-type semiconductor layer, a second P-type semiconductor layer and a second N-type semiconductor layer. The first P-type layer serves as an anode; the second N-type layer, a cathode; and the second P-type layer, a gate. A gate current is applied between the gate and cathode to control the conductivity between the anode and cathode. Once the switch has been turned on or off by the gate current between the gate and cathode, it remains in the on or off state even without continuing to apply the gate current to it, so that it is capable of being switched by a low power source and is suitable for use as a switching element of the horizontal deflection circuit. Further, generally, a horizontal deflection pulse produced by the operation of the switching element of the horizontal deflection circuit is boosted by a flyback transformer and rectified to serve as the high voltage for the cathode ray picture tube. However, prior horizontal deflection circuits using such a thyristor have defects such as complexity in the construction for operating the thyristor, deterioration of the horizontal deflection current, and so on.

It is one object of this invention to provide an improved solid-state horizontal deflection circuit using a gate-controlled switching device.

Another object of this invention is to provide a horizontal deflection circuit using a gate-controlled switching device effectively controlled by an improved gate current applying system.

A further object of this invention is to provide a horizontal deflection circuit using a gate-controlled switching device and producing a horizontal deflection current of high quality.

Still a further object of this invention is to provide a solid-state horizontal deflection circuit including a high voltage producing circuit in which a gate-controlled switching device and another semiconductor switching device are provided for producing, respectively, a horizontal deflection current and a pulse voltage to make a high voltage applied to a cathode ray tube and both switching devices are coupled with each other to operate with improved efficiency.

Other objects and aspects of this invention will be apparent from the following specification, together with drawings.

SUMMARY OF THE INVENTION

This invention is directed to a horizontal deflection circuit employing such a GCS as abovementioned in which a switching element for supplying a horizontal deflection current to a deflection coil and a switching element for generating a pulse voltage necessary for producing a high voltage to be supplied to a cathode ray tube are separately provided and at least the former switching element is a GCS.

DESCRIPTION OF THE PREFERRED EMBODIMENTS

Figure 1:
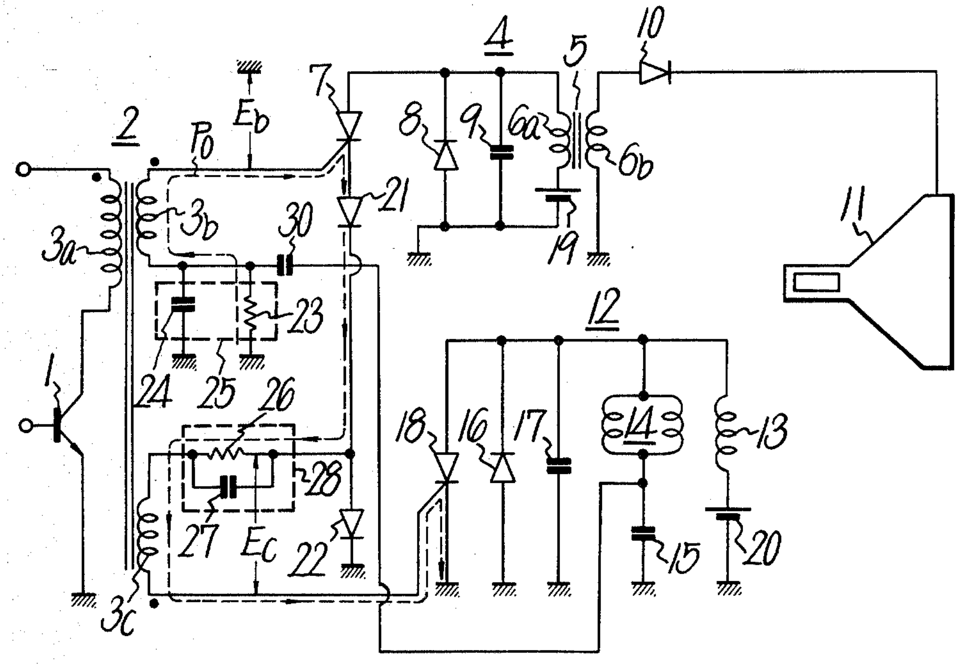
FIG. 1 is a connection diagram showing one example of a horizontal deflection circuit of this invention.

With reference to FIG. 1 a horizontal deflection circuit of this invention with hereinafter be described in detail. A driving transistor 1 is supplied with a rectangular wave signal produced by a horizontal oscillating circuit, which may be of standard construction and is, therefore, not shown, synchronized wiJh a horizontal synchronizing signal. Reference numeral 2 designates a transformer having a primary winding 3*a*, a secondary winding 3*b*, and a tertiary winding 3*c*. A high voltage generating circuit 4 is connectdd to the transformer 2 and comprises a fly-back transformer 5 that has primary and secondary windings 6*a* and 6*b*. A switching element 7, which, in the present example, is a GCS, is connected to the primary 6*a*. A damper diode 8 and a capacitor 9 are also connected to the primary 6*a*. A rectifier 10 connects the secondary 6*b* to a cathode ray tube 11. The secondary winding 3*b* of the driving transformer 2 is grounded through a parallel circuit 25 consisting of a capacitor 24 and a resistor 23. Reference numeral 12 indicates generally a horizontal deflection current generating circuit that includes a horizontal deflection transformer or choke 13, a horizontal deflection coil 14, and a capacitor 15 connected in series thereto. A damper diode 16, a capacitor 17, and a GCS 18 are connected in parallel with the series connected coil 14 and capacitor 15. A direct voltage source 19 furnishes power for the circuit 4, and a second source 20 furnishes power for the circuit 12.

In the present invention, first and second diodes 21 and 22 are connected in the same polarity as the GCS 7 between the cathode of the switching element (the GCS 7 in the example of FIG. 1) and ground. The secondary winding 3b of the transformer 2 is connected at one end to the gate of the GCS 7 and grounded at the other end through the parallel circuit 25. The tertiary winding $3c$ is connected at one end to the connection point of the diodes 21 and 22 through a parallel circuit 28 consisting of a resistor 26 and a capacitor 27 and is connected at the other end to the gate of the GCS 18. The secondary and tertiary windings $3b$ and $3c$ of the transformer 2 are adapted to derive signals of opposite polarities, and in the drawings black dots indicate those ends of the primary, secondary, and tertiary windings $3a$, $3b$ and $3c$ of the transformer 2 which are the same in polarity.

Figures 2A, 2B, 2C, 2D, 2E, 2F, 2G, 2H, 2I:
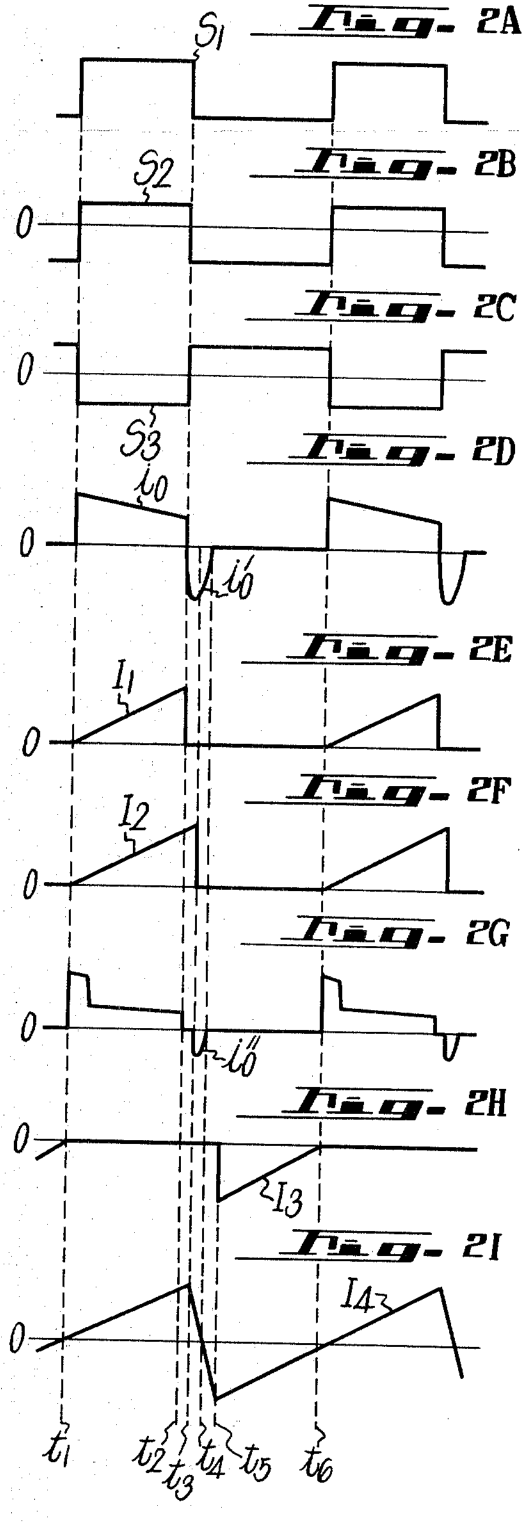
FIGS. 2A–2I are a series of waveform diagrams for explaining the operation of the circuit exemplified in FIG. 1.

With such an arrangement, when a rectangular wave voltage $S_1$, such as is shown in FIG. 2A, is applied through the transistor 1 to the primary winding $3a$ of the transformer 2, rectangular wave voltages $S_2$ and $S_3$, such as are depicted in FIGS. 2B and 2C, are derived at the secondary and tertiary windings $3b$ and $3c$. Accordingly, when the voltage $S_2$ rises at a time $t_1$, a gate current $i_0$ of the GCS's 7 and 18, such as shown in FIG. 2D, flows in a circuit along the path $P_0$ to turn on the GCS's 7 and 18. The anode currents $I_1$ and $I_2$ (currents flowing between the anodes and cathodes) of the GCS's 7 and 18, shown in FIGS. 2E and 2F, flow therethrough from the time $t_1$ to $t_2$ (the positive half cycle of the voltage $S_2$). The waveform of the current $I_2$ is identical with that of a current flowing in the horizontal deflection coil 14 of the horizontal deflection current generating circuit 12. In this case, at the rising of the rectangular wave voltage $S_2$, the gate current $i_0$ is about to flow through the diode 22, but the voltage $S_3$ induced in the tertiary coil $3c$ is opposite in sense to that $S_2$ in the secondary coil $3b$ and is impressed through the gate and cathode of the GCS 18 to the diode 22 to put it in reverse biased condition and hence hold the diode 22 nonconductive. Accordingly, the aforementioned gate current $i_0$ does not flow to the diode 22 and the voltage $S_2$ induced in the winding $3b$ biases the GCS in the forward direction between its gate and cathode to put it in the "on" state. The voltages $S_3$ and $S_2$ induced in the windings $3c$ and $3b$ are superimposed on each other to bias the GCS 18 in the forward direction between its gate and cathode to cause it to conduct. As the gate current $i_0$ and the anode current $I_1$ of the GCS 7 flows in the aforementioned path and charges the capacitor 27, the anode potential of the diode 22 gradually rises to bias the diode 22 in the forward direction to cause it to conduct. Therefore, one portion of the gate current $i_0$ and almost all of the gate current $I_1$ of the GCS 7, which gradually increases because of its being a sawtooth wave, flow in the diode 22. The diode 22 plays an important role to provide a path which prevents the anode current of the GCS 7 from flowing in the GCS 18 except at its rising.

When the rectangular wave voltage $S_1$ falls at the time $t_2$, the aforementioned voltage $S_2$ also falls and a gate current $i_0'$ flows in a path opposite in direction to the path $P_0$ of the gate current $i_0$. The current $i_0'$ flows for a period of time during which the so-called recovery currents of the diodes 21 and 22 flow. The GCS's 7 and 18 are thereby turned off to stop the flow of the anode currents $I_1$ and $I_2$ of the GCS's 7 and 18. In this case, the value $E_c$ of the voltage $S_3$ produced across the tertiary winding $3c$ is selected to be smaller than the value $V_1$ of the breakdown voltage between the gate and cathode of the GCS 18. Mathematically, $E_c < V_1$. The sum of the value $E_b$ of the voltage $S_2$ produced across the secondary winding $3b$ and the aforementioned voltage value $E_c$ is selected to be greater than the sum of the value $V_2$ of the breakdown voltage between the gate and cathode of the GCS 7 and the aforementioned voltage value $V_1$. That is, $E_b + E_c > V_1 + V_2$. Under such conditions the gate current is applied to the GCS's 7 and 18 for the time of circulation of the aforementioned recovery current. Moreover, the diodes 21 and 22 are put in the reverse biased condition at the time $t_2$ when the rectangular wave voltage $S_2$ falls and the recovery current of the diodes 21 and 22 flows, as the gate current $i_0'$ for the GCS 7, from the diode 22 to the resistor 23 through the diode 21, the cathode and gate of the GCS 7 and the secondary winding $3b$ of the transformer 2, by which the GCS 7 is turned off substantially at the time $t_2$. At that time, no current flows from the cathode of the GCS 18 to the diode 21 through the gate of the GCS 18, the winding 3c and the resistor 26 due to the aforementioned relationship $E_c < V_1$. However, the forward current flowing in the diode 22 when the GCS's 7 and 18 are in the "on" state is less than the forward current flowing in the diode 22, so that the time during which the recovery current of the diode 22 flows is shorter than that during which the recovery current of the diode 21 flows. Therefore, the reverse current flowing in the diode 22 stops at the time $t_3$, after which the recovery current of the diode 21 flows as a gate current $i_0''$, shown in FIG. 2G, through the path $P_0$ of the current $i_0$, by which the GCS 18 is turned off substantially at the time $t_2$ due to the aforementioned relationship $E_b + E_c > V_1 + V_2$. The recovery current of the diode 21 stops at the time $t_4$.

After a time $t_5$, a current $I_3$, such as depicted in FIG. 2H, flows in the deflection coil 14 through the damper diode 16 and at a time $t_6$ the voltage $S_1$ rises again. Thereafter the same operations as above described are repeatedly carried out to supply the deflection coil 14 with a current $I_4$, shown in FIG. 2I. Further, the primary winding $6a$ of the flyback transformer 5 of the high voltage producing circuit 4 is supplied with a pulse voltage by the on-off operation of the GCS 7, so that the pulse is boosted by the secondary winding $6b$ and is rectified by the diode 10 to provide a high voltage, which is supplied to the anode of the cathode ray tube 11.

Figure 3:
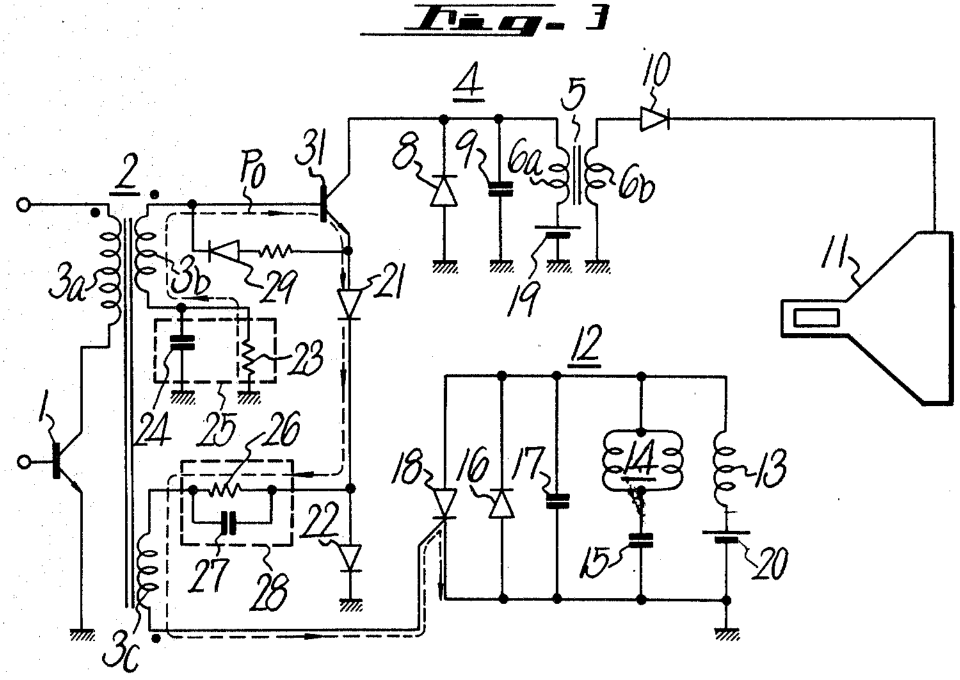
FIGS. 3 and 4 are connection diagrams illustrating modified forms of the horizontal deflection circuit of this invention.

FIG. 3 illustrates another embodiment of this invention in which elements similar to those in FIG. 1 are marked with the same reference numerals and in which the GCS 7 of the high voltage producing circuit 4 is replaced with a transistor 31. The transistor 31 is turned on and off by the rectangular wave voltage $S_2$ induced in the secondary winding $3b$ of the drive transformer 2, but the GCS 18 is turned off by the recovery current of the diode 21 as is the case in FIG. 1. The other operations are the same as those in the example of FIG. 1, and, accordingly, no detailed description will be repeated. Reference numeral 29 indicates a diode connected between the base and emitter of the transistor 31, which is provided for preventing breakdown of the transistor 31 when its recovery current flows, but this diode is not always necessary.

In the present invention, since the output currents from the secondary and tertiary windings $3b$ and $3c$ of the transformer 2 are superimposed on each other and applied to the control electrodes of the switching element 7 and the GCS 18, that is, to the gate current path as above described, the GCS's 18 and 7 can be turned on and off without fail. In the illustrated example, the parallel circuit 28 is interposed between the connection point of the diodes 21 and 22 and the tertiary winding 3c but may be connected between the gate of the GCS 18 and the tertiary winding 3c.

In the example of FIG. 1, the connection point of the horizontal deflection coil 14 and the capacitor 15 is connected through the capacitor 30 to the connection point of the secondary winding 3b and the parallel circuit 25. With such a connection, a parabolic voltage generated at the connection point of the horizontal deflection coil 14 and the capacitor 15 is applied to the connection point of the secondary winding 3b and the parallel circuit 25, thereby to facilitate turning on and off the GCS 7. Due to this parabolic voltage, the gate potential of the GCS 7 is raised at the time of turning on the GCS 7 and lowered at the time of turning it off.

Figure 4:
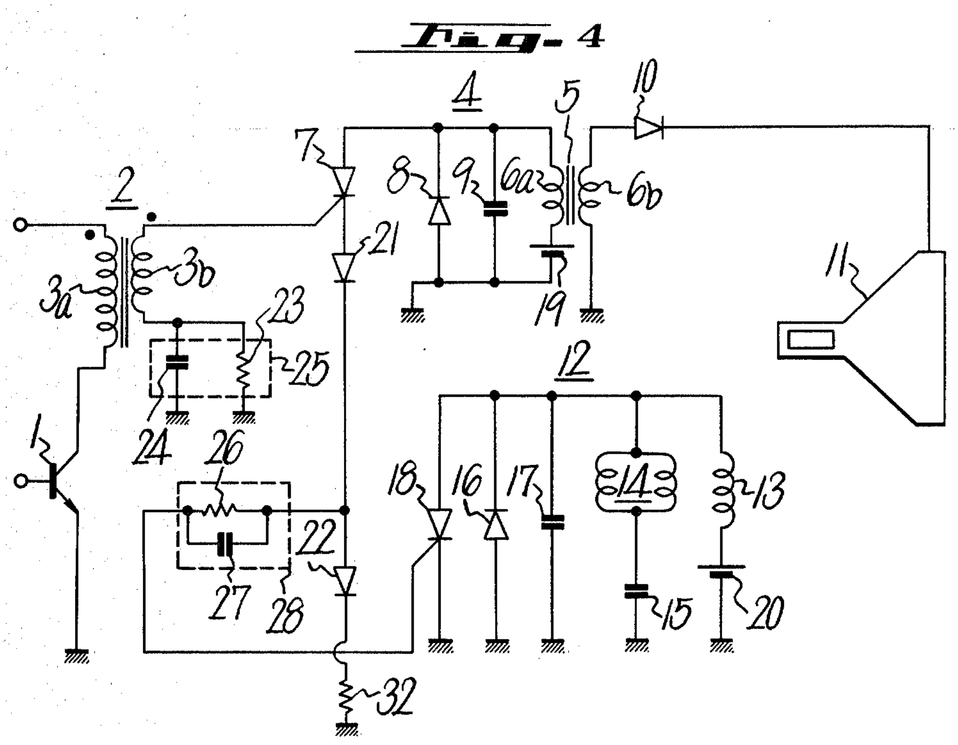

FIG. 4 illustrates another embodiment of this invention in which the tertiary winding 3c of the drive transformer 2 in the example of FIG. 2 is not employed and the connection point of the diodes 21 and 22 is connected directly to the gate of the GCS 18 through the parallel circuit 28 of the resistor 26 and the capacitor 27. Further, the cathode of the diode 22 is grounded through a resistor 32. The on-off and other operations of the GCS's 7 and 18 are also substantially the same in this embodiment as in the embodiment of FIG. 2. However, the present example is different from that of FIG. 2 in that the gate current of the GCS's 7 and 18 and the anode current of the GCS 7, having passed through the diode 21, are shunted from a path leading to the diode 22 and the resistor 32 to a path leading to the gate of the GCS 18 through the parallel circuit of the resistor 26 and the capacitor 26. The resistor 32 is provided to direct the shunted current to the gate of the GCS 18 and its resistance value is selected to permit flowing of the shunted current as a gate current enough to turn on the GCS 18.

Figures 5A, 5B, 5C, 5D, 5E, 5F, 5G, 5H:
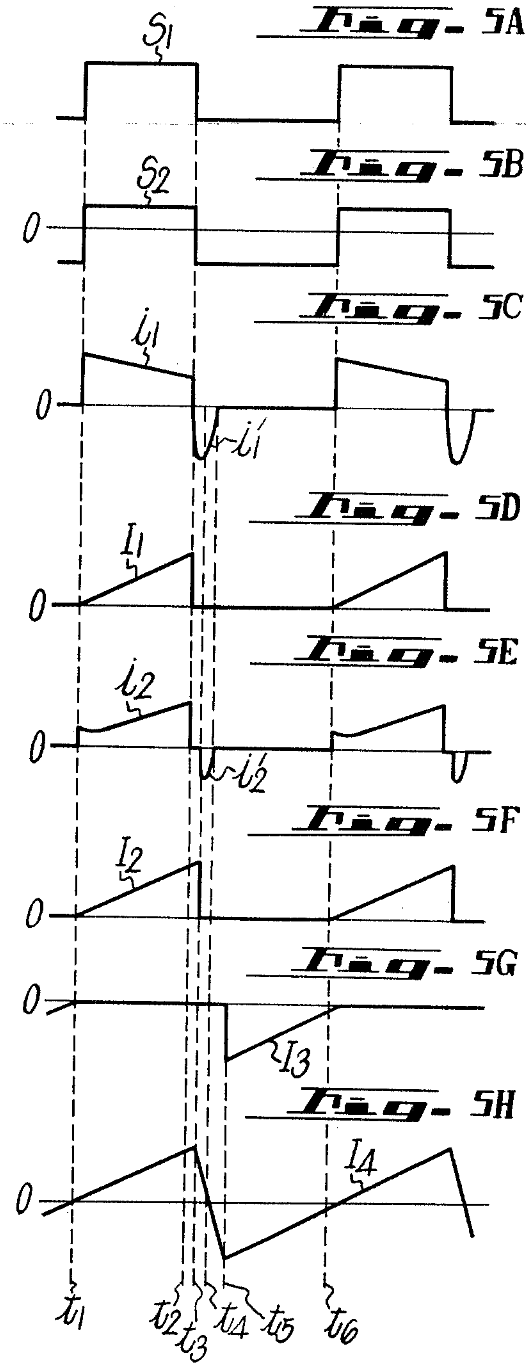
FIGS. 5A–5H are a series of waveform diagrams for explaining the operation of the circuit depicted in FIG. 4.

A detailed description will be given of the circuit in FIG. 4. A rectangular wave voltage $S_1$, such as shown in FIG. 5A, is supplied to the primary winding 3a of the drive transformer 2 so that a rectangular wave voltage $S_2$, such as depicted in FIG. 5B, is induced in the secondary winding 3b. From the time $t_1$ of rising of the rectangular wave voltage $S_2$, a gate current $i_1$ to the GCS 7, such as shown in FIG. 5C, flows in a path from the secondary winding 3b through the gate of the GCS 7, its cathode, the diode 21, the diode 22, the resistor 32, and the parallel circuit 25 of the resistor 23 and the capacitor 24 back to the secondary winding 3b. Further, the gate current $i_1$ is also shunted to the gate and cathode of the GCS 18. As a result, the GCS 7 is turned on at the time $t_1$. When the GCS 7 is turned on, an anode current $I_1$ of the GCS 7 as depicted in FIG. 5D is shunted to the diodes 21 and 22 from the GCS 7 and to the gate and cathode of the GCS 18 through the parallel circuit 28 of the resistor 26 and the capacitor 27 from the GCS 7. Consequently, a gate current $i_2$, such as depicted in FIG. 5E, that consists of one portion of the gate current $i_1$ and one portion of the anode current $I_1$ of the GCS 18 superimposed upon each other, flows in the gate and cathode of the GCS 18 to turn it on at the time $t_1$. This causes an anode current $I_2$, such as shown in FIG. 5F, to flow in the GCS 18. The anode current $I_2$ is supplied to the deflection coil 14. In this case, the value of the gate current $i_2$ of the GCS 18 is suitably selected dependent upon the values of the resistors 32 and 26. Further, the gate current $i_2$ is controlled by the capacitor 27 so that it does not increase excessively relative to the increase in the anode current $I_1$ of the GCS 7.

At the time $t_2$ when the rectangular wave voltage $S_1$ falls, the rectangular wave voltage $S_2$ becomes negative and the gate current $i_1$ is stopped and, at the same time, the diodes 21 and 22 are put in reverse biased condition, so that the recovery current of the diodes 21 and 22 flow as a gate current $i_1'$ of the GCS 7 through the resistor 32, the diodes 22 and 21, the cathode and gate of the GCS 7, the secondary winding 3b and the parallel circuit 25 of the resistor 23 and the capacitor 24, thereby turning off the GCS 7. Therefore, the anode current $I_1$ of the GCS 7 stops substantially at the time $t_2$. In this case, the forward current flowing in the diode 22 from the time $t_1$ to $t_2$ is less than the forward current flowing in the diode 21 by the amount corresponding to the gate current $i_2$ of the GCS 18. Consequently, the time during which the recovery current of the diode 22 flows is shorter than that of the diode 21. Accordingly, while the recovery current of the diode 21 is still flowing, that of the diode 22 stops flowing at a time $t_3$ and the recovery current of the diode 21 flows as a gate current $i_2'$ of the GCS 18 through the cathode and gate of the GCS 18, the parallel circuit 28 of the resistor 26 and the capacitor 27, the diode 21 and the GCS 7, causing the GCS 18 to be turned off. Consequently, the anode current $I_2$ of the GCS 18 stops flowing substantially at the time $t_3$. The flow of the recovery current of the diode 21 stops at a time $t_4$. Thereafter, a damper current $I_3$, such as depicted in FIG. 5G, flows from a time $t_5$, so that the deflection coil 14 is supplied with a horizontal deflection current I, such as shown in FIG. 5H. Further, the primary winding of the flyback transformer 5 is supplied with a pulse of a predetermined width which is generated when the anode current $I_1$ of the GCS 7 stops. The pulse is derived from the secondary winding of the flyback transformer 5 after being boosted and then it is rectified to provide a high voltage. Thereafter, the rectangular wave voltage $S_1$ rises again at a time $t_6$ and the foregoing operations are repeated.

Figure 6:
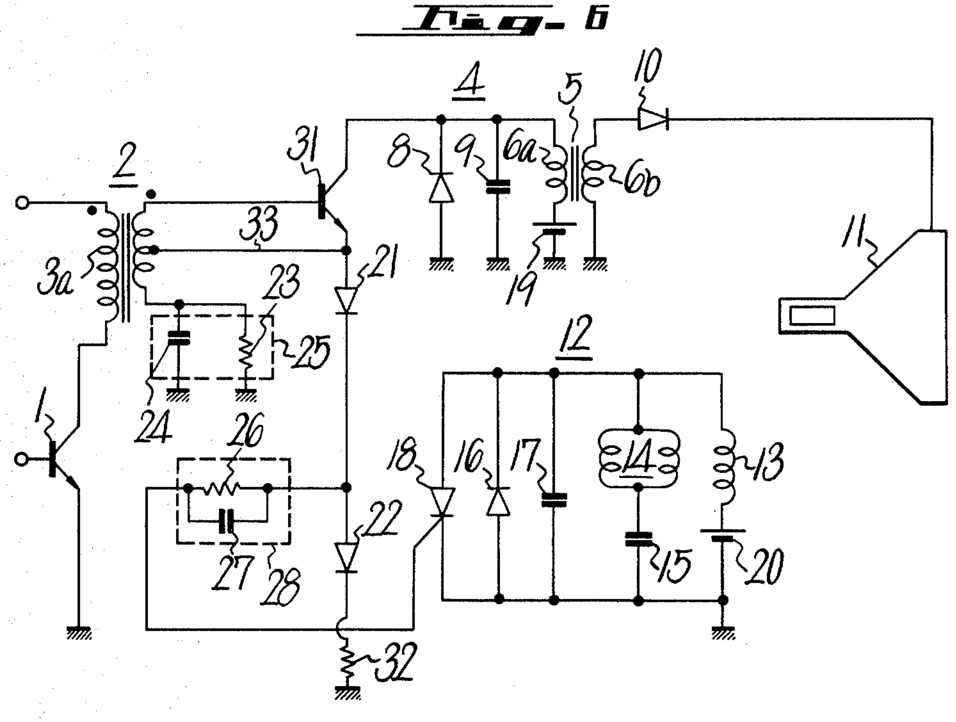
FIG. 6 is a connection diagram showing another modified form of the horizontal deflection circuit of this invention.

FIG. 6 shows another example of this invention which employs the transistor 31 in place of the GCS 7 of FIG. 4, as is the case with FIG. 3, and which is the same in operation as the example of FIG. 3. Therefore, no detailed description will be given, but, in this case, the recovery currents of the diodes 21 and 22 do not flow in the transistor 34 through the short path 33.

As has been described in the foregoing, in the present invention a series circuit of two diodes is connected to the cathode of, for example, a GCS serving as a first switching device of a high voltage generating circuit and a GCS serving as a second switching device of a horizontal deflection current applying circuit is connected to the series circuit and the switching of both of the switching devices is controlled by a voltage derived from the secondary winding of a drive transformer. In this invention, the series circuit is provided for coupling the switching devices in the current path of the secondary winding of the drive transformer, so that the circuit construction is simple as a whole. Further, since the two switching devices, at least one of which is a GCS, are controlled only by the voltage induced in the secondary winding, the horizontal deflection circuit of this invention is low in power dissipation and hence is economical.

Moreover, no nonlinear characteristic element such as a transistor, diode or the like is inserted in the anode current path of the GCS acting as a switching device used in the horizontal deflection current applying circuit. Therefore, the linearity of the horizontal deflection current flowing in the deflection coil is never impaired and a horizontal deflection current of high quality can be obtained.

It will be apparent that many modifications and variations may be effected without departing from the scope of the novel concepts of this invention.

What is claimed is:

1. A horizontal deflection circuit including a high voltage producing circuit comprising:

A. A flyback transformer comprising a primary and a secondary;

B. A semiconductor switching device having first, second and third electrodes, said first electrode being connected to said flyback transformer to induce a high voltage in said secondary and said semiconductor switching device passing a current flowing from said first electrode to said third electrode during conduction caused by a signal applied to said second electrode;

C. A horizontal deflection coil;

D. A first gate-controlled switching device having first, second and third electrodes, said first electrode being connected to said horizontal deflection coil and said gate-controlled switching device passing a current flowing from said first electrode to said second electrode during conduction caused by a signal applied to said second electrode;

E. A driving signal source connected to the second electrode of said semiconductor switching device for applying a driving signal thereto;

F. A series connection of first and second diodes connected with the same polarity, said series connection of the diodes being coupled with the third electrode of said semiconductor switching device; and G. Coupling means for coupling the second electrode of said gate-controlled switching device with the connection point between said first and second diodes.

2. A horizontal deflection circuit according to claim 1, in which the third electrode of said gate-controlled switching device is directly grounded.

3. A horizontal deflection circuit according to claim 1, comprising, in addition, a resistor, one end of said series connection of the diodes being connected to the third electrode of said semiconductor switching device and the other end being grounded through a resistor.

4. A horizontal deflection circuit according to claim 3, in which said coupling means comprises a capacitor and a resistor connected in parallel to each other.

5. A horizontal deflection circuit according to claim 4, in which said semiconductor switching device comprises a second gate-controlled switching device, the gate of said second gate-controlled switching device being connected to said driving signal source.

6. A horizontal deflection circuit according to claim 3, in which said semiconductor switching device comprises a transistor, the base and emitter electrodes of said transistor being connected to said driving signal source.

7. A horizontal deflection circuit according to claim 1, in which said coupling means comprises an additional signal source.

8. A horizontal deflection circuit according to claim 7, in which said coupling means further comprises a parallel connection of a capacitor and a resistor coupled in series with said additional signal source.

9. A horizontal deflection circuit according to claim 8, in which said driving signal source and additional signal source comprise a driving transformer having a plurality of windings.

10. A horizontal deflection circuit according to claim 9, in which said semiconductor switching device comprises another gate-controlled switching device.

11. A horizontal deflection circuit according to claim 9, in which said semiconductor switching device comprises a transistor having an additional current path provided between the base and emitter electrodes thereof.

* * * * *